United States Patent [19]

Maag et al.

[11] 4,292,769

[45] Oct. 6, 1981

[54] BALANCING AND MONITORING APPARATUS

[75] Inventors: Willi Maag, Rheinau; Hans U. Baumgartner, Winterthur; Max Vollenweider, Winterthur; Hans J. Wolf, Freienstein, all of Switzerland

[73] Assignee: Kistler Instrumente AG, Winterthur, Switzerland

[21] Appl. No.: 946,869

[22] Filed: Sep. 29, 1978

[30] Foreign Application Priority Data

Sep. 29, 1977 [CH] Switzerland ............... 011879/77

[51] Int. Cl.³ ............................................. G01M 1/34
[52] U.S. Cl. ..................................... 51/169; 73/468; 74/573 R
[58] Field of Search .............. 51/169, DIG. 33, 106 R; 73/462, 468; 74/573 R; 118/669, 670

[56] References Cited

U.S. PATENT DOCUMENTS

| 2,796,600 | 6/1957 | Church | 73/462 |
|---|---|---|---|
| 2,947,172 | 8/1960 | King | 73/462 |
| 3,273,293 | 9/1966 | Sonderegger | 51/169 |
| 3,553,903 | 1/1971 | Christie | 51/DIG. 33 |
| 3,848,368 | 11/1974 | Toshioka et al. | 51/106 R |
| 3,939,715 | 2/1976 | Davis | 73/462 |
| 3,968,769 | 7/1976 | Gusarov et al. | 73/468 |
| 4,118,933 | 10/1978 | Coleman et al. | 73/462 |

FOREIGN PATENT DOCUMENTS

| 401533 | 5/1966 | Switzerland | 51/169 |
|---|---|---|---|
| 418001 | 2/1967 | Switzerland | 51/169 |

Primary Examiner—Harold D. Whitehead
Assistant Examiner—K. Bradford Adolphson
Attorney, Agent, or Firm—Craig and Antonelli

[57] ABSTRACT

A device for balancing rotating bodies including a sensing arrangement for sensing the out of balance of the rotating body and for abrasion tool at a frequency corresponding to the speed of the rotating member so as to remove material from the rotating member in phase with the working vibration in the same region of the rotating member for effecting a balancing of the rotating member. The apparatus also includes an adjusting arrangement enabling adjustment of the phase relationship of the vibration of the abrasion tool with respect to the phase relationship of the out-of-balance signal so as to effect shifting by any number of steps of 360°/n, n being a whole number > 3, irrespective of the speed of the rotating member.

21 Claims, 8 Drawing Figures

BALANCING AND MONITORING APPARATUS

The invention relates to an apparatus for balancing and monitoring rotating members, in particular for balancing and monitoring grinding wheels during their operation. Exact balancing of the rotating system is a great significance for many processing machines with a rotating tool, but especially in grinding machines. In grinding machines, an unbalanced grinding wheel will run out-of-true and this will be apparent on the ground surface of the workpiece. Therefore, exact balancing of the grinding wheel is indispensable for the finest and most uniform grinding. Since grinding wheels become unbalanced due to wear, constant monitoring of the vibrations is advantageous. As soon as the latter exceed a certain tolerance level, balancing is once more necessary. To eliminate the unbalance, in this connection, grinding machines are already known which comprise incorporated means for establishing the magnitude and angular position of the unbalance. Then, when the machine is stationary, the unbalance may be compensated for in known manner by means of adjustable balance weights. This correcting operation must frequently be repeated several times, which leads to undesirable operating interruptions. Stationary balancing frequently proves too inaccurate for operation, since frequently dynamic forces and shifts have an effect which is only felt during operation.

Furthermore, grinding machines are even known which facilitate balancing during running of the machine, but at relatively high cost. For this purpose, weights can be shifted inside the grinding wheel until the unbalance has been compensated for. Complicated arrangements for automatic balancing are known, in which weights of this type are shifted automatically according to the existing unbalance.

In contrast to the latter, the invention makes it possible to carry out monitoring and balancing on an operating grinding wheel or rotating member, with relatively simple means and in particular by the simple and favourable removal of material as regards stability. In this case, the apparatus may consist of a monitoring part mounted in a fixed manner on the machine and of a portable balancing part or both parts may be constructed to be fixed or portable.

However, the invention is not restricted solely to use on grinding machines. It is equally suitable for all types of balancing machines. In machines of this type, the rotor to be balanced was hitherto mounted on a specially mounted shaft and set in rotation. In this case, the unbalance was ascertained with known means as regards position and magnitude. By releasing the rotor and drilling away, the material causing the unbalance is gradually removed, until finally an unbalance is no longer indicated. This process necessitates several operations and also requires considerable specialised knowledge, due to which the entire process becomes very expensive. The balancing method to which the present invention relates provides making continuous measurements during operation, in the same set-up and removing material from the correct point. It is thus possible to ensure very rapid, inexpensive and troublefree balancing, which is always carried out when required. In addition, the removal of material achieved in this way is substantially more favourable as regards stability, than is the case when drilling the material away in the conventional manner.

The apparatus according to the invention comprises a vibration pick-up fitted when mounting the rotating member, preferably an acceleration pick-up, which follows the bearing variations and produces an electrical signal of sinusoidal nature, which corresponds to the component of the inbalance force falling in the plane of the axis of rotation of the rotating member and the transducer and an electrical actuator controlled by the signal, whose movable part supports an abrasion tool, which when a signal is produced carries out working vibrations at a frequency corresponding to the speed of the rotating member and until the unbalance or the signal disappears, removes material from the rotating member, virtually in phase with each working vibration in the same angular region of the rotating member.

In a particularly preferred embodiment of the invention, an acceleration pick-up comprises a piezo-electric member, whose output is used for controlling the abrasion tool. The actuator controlled by the signal may appropriately be constructed as a vibrating magnet. Means are advantageously provided for amplifying the signal produced by the vibration pick-up, before the latter is supplied to the actuator. Also, means may appropriately be provided for indicating the value of the amplitude of the signal produced. These indication means make it possible to ascertain at any time the value of the unbalance or the effectiveness of a balancing operation which is initiated. A limit value switch can be connected to the indicator system, which switch initiates a warming signal when a certain tolerance value for the vibrations is exceeded.

A balancing apparatus of the type just described is known and described in detail in Swiss Patent No. 401 533 (Sonderegger et al, May 14, 1966). This patent deals mainly with two types of construction, namely with an in-built tool component and with a hand tool. Whereas nothing was known of an in-built tool component, until this application was filed, the hand tool has been produced and sold in large numbers. Whereas earlier known balancing apparatus were either built into the grinding devices or parts to be balanced were located in specially equipped balancing workshops, the balancing hand tool which is moved from machine to machine provided a new philosophy of application, which the apparatus according to the invention takes into consideration to a considerable extent. In a known embodiment of such a balancing hand tool apparatus, a vibration pick-up, actuator and electronic unit and cable were packed in a special wooden box, as is customary for electronic appliances. The workshop mechanic, who occasionally wished to balance a grinding wheel, had first to consult the operating instructions, in order to fit the apparatus together, put the latter into operation and carry out the balancing correctly. It was also necessary for him to carry out prior complicated frequency tuning on the vibration pick-up, which is difficult insofar that it is necessary to carry out tuning on the vibration pick-up itself and in the meantime to take readings from the electronic appliance, which is located elsewhere, so that tuning took place moving back and forth from one appliance to another, which was also found to be troublesome. The method of operation of this read vibration pick-up is described in German Patent No. 1 473 486 (Sonderegger et al, Apr. 17, 1969), Column 6, Line 23 to Column 7, Line 8. Such a design of balancing apparatus is not suited to the personnel who must operate them, since the operation is too complicated. The above-mentioned design also has a technical inadequacy, which consists in that the phase relationship between the pick-up vibration and the vibration of the abrasion tool can only be varied through 180° by reversing the polarity by means of a switch. It was also necessary for the person using this afore-mentioned balancing apparatus to search on the grinding wheel for the sector of the grinding wheel from which material was to be removed, in order that balancing could take place at all. In order to prevent accidents, recently, grinding machine manufacturers have tended to cover the grinding wheels as far as possible and only to expose the sector of the grinding wheel where grinding takes place. It therefore frequently occurs that exactly the sector of the grinding wheel where balancing is to take place, is covered and inaccessible. It is therefore a technical requirement to be able to vary the phase relationship between the pick-up vibration and the vibration of the abrasion tool with a finer graduation.

In order that a balancing apparatus is equal to the high requirements of the workshop personnel, who must operate this appliance, as regards simplicity, ease of handling and reliability, the following new requirements exist for a better design of a balancing apparatus with abrasion tool;
1. The insertion point for abrasion on the grinding wheel must be able to be adjusted from 45° to 45°, in which case the angle of rotation on the rotary phase adjustment switch appropriately corresponds exactly to the displacement angle of the insertion point for abrasion.
2. Tuning for the number of revolutions should take place on the electronic apparatus, where the intensity of vibrations is also indicated.
3. Location of the vibration pick-up and of the abrasion tool with the cable as well as the mains connecting cable in the electronic appliance itself without dismantling of the cable.
4. Easy handling of the appliance. Ease of reading of the indicator instrument for the unbalance with a large angle of view from a considerable distance.
5. Protection of the control members from damage by impact.
6. Provision of the rear face of the instrument with support feet.

Consideration of the user's wishes led to a new design which is the object of the present invention. The latter is thus a development of an existing invention which is the basis of Swiss Patent No. 401 533.

Seen from the electronic stand point, the phase-adjustment possibility of the pick-up vibration with regard to the vibration of the abrasion tool, which is desirable in the new design, is a difficult problem and requires an expensive improvement. There are many methods and circuits with which it is possible to produce phase shifts. Most are based on the fact that in some way a signal delay with regard to time is produced, which with a fixed speed of rotation of the specimen likewise produces an angular displacement proportional to time.

A difficult problem consists in that the same balancing apparatus is to be used for rotary speeds of 600 r.p.m. up to 6,000 r.p.m. A phase shift member in the signal channel, which provides a signal delay with regard to time of 1 millisecond for example, produces a phase shift angle of 3.6° at 600 r.p.m. and an angle of 36° at 6,000 r.p.m. The respective calibration of the phase shift member in the electronics would be dependent on the respective number of revolutions and if one wished to provide a phase shift, it would firstly be necessary to take into consideration the respective valid calibration of the phase-adjustment switch and then to calculate the desired adjustment. This would certainly not be within the scope of a simple operating philosophy.

According to the present invention, a phase-locked multiplier circuit is used. This makes it possible to adjust the phase shift by means of a switch, throughout the entire range of number of revolutions, completely independently of the number of revolutions. With this circuit it is possible to divide each period of revolution of the rotary member into n successive partial periods, irrespective of the number of revolutions, which partial periods all have a fixed but varying phase relationship with regard to the passages of the pick-up signal through zero. For the case of balancing grinding wheels with a hand tool, it is appropriate to select n=8, this means that phase shift steps of 45° are possible and the insertion point for the abrasion tool can be adjusted with a discrepancy of +22.5° to −22.5° with regard to the positional angle of the unbalance. According to experience, an unbalance is possible up to a discrepancy of +60° to −60°. Naturally, a finer division would be quite possible by selecting a higher n, but the higher expenditure would not be compensated by substantially better balancing and the operation would consequently be more complicated. The phase-locked frequency multiplier circuit does not operate with a time-lag, but it produces an upper frequency which is exactly eight times the pick-up frequency and in addition ensures that passages of the basic vibration through zero correspond to passages of the harmonic vibration through zero. The frequency multiplier circuit consists of a phase-locked loop and a reduction circuit. The phase-locked loop circuit multiplies the basic frequency by eight and the reduction circuit returns the frequency to the simple frequency at which the abrasion tool is operated. Eight outputs of the circuit are thus available, which all have a phase shift of 45° with respect to each other and are available for use at any time or can be selected with a multi-point switch. The phase-locked loop circuit is nothing new in itself. It is used in electronics as a frequency synthesizer and also serves for the demodulation of frequency—or amplitude—modulated signals. This circuit can be obtained as an integrated circuit, as a mass produced product at favourable prices. The same is also true for the reducer, which finds multiple uses in meter circuits, computers etc. The combination of such a phase-locked loop with a reduction circuit for producing phase shifts is not the use for which these components are actually provided, but is rather an abnormal use of these components. On the other hand, the use of this phase-locked multiplier circuit in the design of such a balancing hand tool is new. It is particularly advantageous because it uses inexpensive components which are intented for other mass uses and it is thus possible for a small amount of money to assemble many and relatively complicated electronics which facilitate great operating convenience, which is necessary when operating this hand tool.

The afore-described electronics provide simplication of operation, which however involves a certain expenditure, which would not be justified if in the overall concept it were not connected with other simpler and cheaper measures of a more practical nature, which likewise bring about simplification of the operation. Only a combination of the electronics with these simple measures to form a complete concept with the aim of "simple operation" makes the latter meaningful from the practical, in particular the sales point of view. These measures are: the possibility of locating the components and cable in a box without dismantling the cable; adjustment of the number of revolutions and the possiblity of reading-off the level of unbalance on the same application; details on the instruments for indicating the unbalance, stating whether balancing should be carried out with the actuator or balancing weights; logarithmic scale for the vibration amplitude with the possibility of reading-off the vibration to several decimal places without changing-over the instrument; also, the provision of simple operating instructions on the inside of the lid of the electronic box. Designing the box such that the control members cannot be damaged.

BRIEF DESCRIPTION OF THE DRAWINGS

The method of operation of the balancing and monitoring apparatus will be described in detail hereafter with reference to the following figures.

DETAILED DESCRIPTION OF THE DRAWINGS

The detailed method of operation can be explained with reference to FIG. 1.

Figure 1:
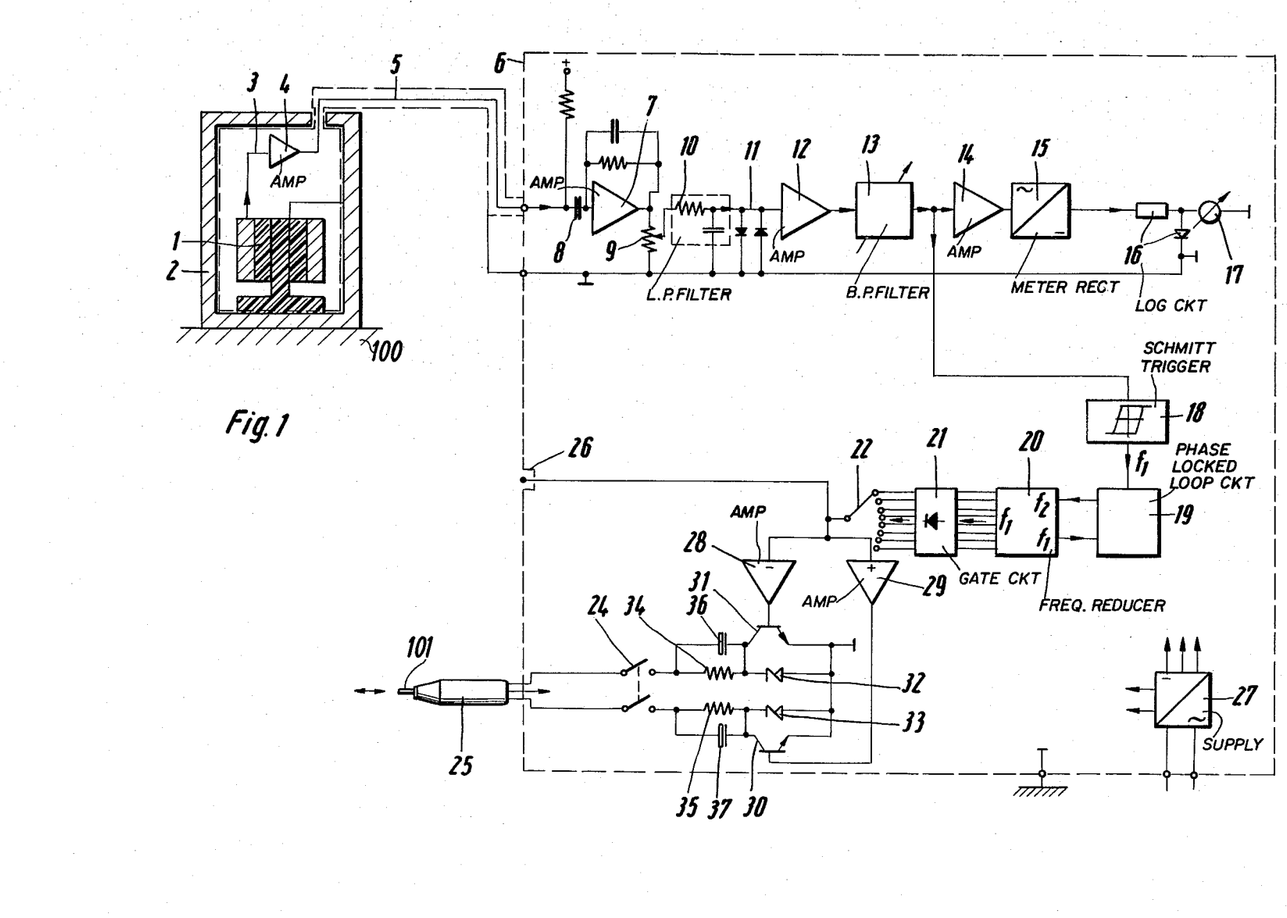
FIG. 1 is a diagrammatic illustration of the vibration pick-up and the electronics of the entire concept.

As regards FIG. 1: A movement of the support of the vibration pick-up consisting of the pick-up system 1 and housing 2 located on a mounting of a rotation member 100, which movement is caused by rotation of an unbalance, is accompanied by the vibration pick-up. Provided that the movement contains a component of an unbalance force falling in a plane of an axis of rotation of the rotating member and in the axial direction of the pick-up, a voltage change occurs at the input 3 of the amplifier 4, which change decays exponentially with a time-constant of approximately 2.3 seconds. The voltage change is caused by a mechanical/electrical vibration pick-up system 1, for example a piezo-electric, resistive, capacitive or inductive system, which responds to the vibration travel, speed or acceleration. The voltage change at the input 3 of the amplifier 4 brings about a current change at the output of the amplifier. The amplifier 4 is connected to the remaining electronics by a screened cable 5 between the amplifier 4 and electronic appliance 6. The cable 5 serves simultaneously for supplying the amplifier 4 in the housing 2 as well as for transmitting the applied current signal from the vibration pick-up to the electronic part.

After transmitting the current signal, the signal is firstly sent to the current/voltage transformer amplifier 7, which re-converts the current signal into a voltage signal. The d.c. component, which is necessary for operating the amplifier 4, is separated by means of the coupling capacitor 8. In the potentiometer 9, the signal is reduced and the sensitivity of the entire vibration measuring device is adjusted to its reference value. After the first integration, the signal is integrated a second time in the low-pass filter 10, by which it is achieved that a signal roughly proportional to displacement is produced from the signal proportional to acceleration. In the limiting circuit 11, extremely high amplitudes, which could occur for example due to unskilled operation of the vibration pick-up, are cut-off electrically and the subsequent electronics are protected from overloading. After passing through the impedance transformer amplifier 12, the signal reaches the Wien bridge band-pass filter 13.

Figure 2:
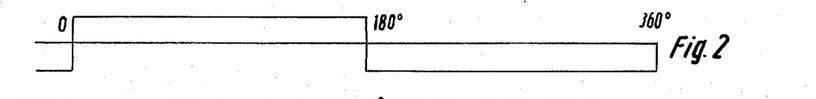
FIG. 2 shows the square wave signal which is transmitted from the Schmitt trigger to the phase-locked loop circuit.
Figure 3:
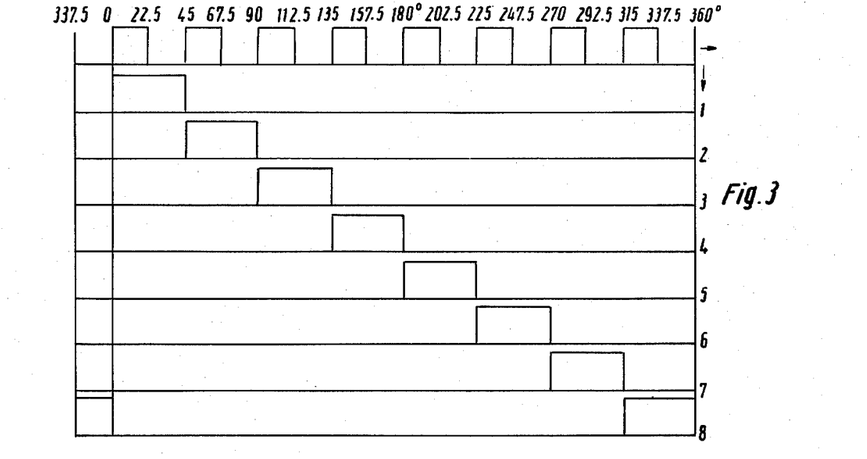
FIG. 3 shows the phase relationship of the signals which come from the phase-locked loop circuit and the eight signals which appear at the outputs of the subsequent reducer circuit.

The Wien bridge band-pass filter 13 is set exactly at the unbalance frequency, which the vibration pick-up receives and eliminates all foreign signals with other frequencies, which do not originate from the unbalance of the rotary member to be balanced. The latter is a Wien bridge band-pass filter 13 with a resonance step-up—Q—factor of approximately 100. The signal channels branch after the Wien bridge band-pass filter 13. One signal channel passes by way of the indication amplifier 14 to the meter rectifier 15 from there to the logarithmation circuit 16 consisting of the diode and resistor and to the instrument 17, where the amplitude of the unbalance displacement is indicated on a logarithmic scale. This instrument 17 serves for checking the success of a balancing operation with the actuator on a grinding wheel. The other signal channel leads by way of the Schmitt trigger with hysteresis 18 to the so-called phase-locked loop circuit 19. As shown in FIG. 2, a square wave signal is transmitted from the Schmitt trigger 18 to the phase-locked loop circuit 19. This phase-locked loop circuit 19 is in principle an oscillator, which operates exactly at a multiple f2 and simultaneously in phase with an arriving control signal f1. In the present case, the multiple is eight-fold. The phase-locked loop circuit 19 divides a vibration period T of the square wave unbalance signal f1 into eight partial periods each of $\frac{1}{8}$T (see FIG. 3 input). This eight-fold frequency f2 is sent to a frequency reducer 20 which once more divides the frequency eight-fold. This divided signal (cf. FIG. 3 output 1), which once more has the frequency f1 of the basic signal FIG. 2, is returned to the phase-locked loop circuit 19, where it is compared with the basic signal FIG. 2, which comes from the Schmitt trigger 18. If the signal from the frequency reducer 20 has a phase lead with respect to that from the Schmitt trigger 18, the frequency of the phase-locked loop circuit 19 is reduced somewhat. The phase is delayed somewhat and is adapted to the signal from the Schmitt trigger 18. Vice versa, a lag is equalized by increasing the frequency of the phase-locked loop circuit 19. In this way, one obtains a signal from the frequency reducer 20, which signal is completely synchronous with and exactly in phase with the control signal, which is based on the vibration pick-up signal. However, the synchronism and the phase-locking also exist for the signal with the eight-fold frequency and all division frequencies, which must be produced in the frequency reducer 20. By combining the various suitable division signals, the frequency reducer 20 finally delivers eight signals from eight different channels, which have the same frequency f1 as the control signal from the Schmitt trigger 18, but have a phase shift with respect to the latter of 0°, 45°, 90°, 135°, 225°, 270° and 315° (c.f. FIG. 3). The latter are square wave signals with a duration of 45°.

With the gate circuit 21, due to the logical gating of two successive signals, square wave signals are produced whose duration is exactly 90°. This is a signal duration which is particularly suitable for keeping the actuator 25 engaged for a sufficiently long, but not excessively long period of time. With the phase angle selector 22, a signal can be tapped-off with the desired phase relationship, in which case the phase differences from position to position amount to respectively 45°. The pre-set signal is sent by way of the components of the power stages 28 to 37 to the actuator 25, which initiates the engagement of the abrasion tool 101 according to the square wave signal, the actuator having a part for supporting the abrasion tool. The reference numeral 24 designates a switch which makes it possible to start and stop the actuator. The reference numeral 27 designates the current supply for the entire electronics. The Schmitt trigger 18 has two functions. On the one hand, it converts the strictly sinusoidal signal from the Wien bridge band-pass filter 13 into a square wave signal, in which case the passages of the sinusoidal signal through zero correspond roughly to the passages of the square wave signal through zero. However, the Schmitt trigger 18 has a certain hysteresis, i.e. it operates not exactly when the sinusoidal signal passes through zero, but the sinusoidal signal must firstly pass slightly into the positive, in order that the Schmitt trigger 18 changes from minus to plus and then the sinusoidal signal must once more pass slightly into the minus region in order that the Schmitt trigger 18 switches back from plus to minus. The Schmitt trigger 18 no longer responds to very small signals, which are smaller than the hysteresis interval, due to which, in the case of well-balanced rotary members, the actuator 25 is prevented from responding to disturbance voltages which have nothing to do with the unbalance of the rotary member and from removing material from the grinding wheel at incorrect phase angles. When the unbalance signal has become so small that the unbalance movement corresponds to only a displacement of 0.05 to 0.02 μm, the actuator 25 stops and balancing is terminated. At the plus socket 26, which is connected to the slider of the phase angle selector 22, a signal for triggering a stroboscope can be emitted. The position of an unbalance on a rotary member can then be made visible by the stroboscope light. The final power stage consists of the non-inverting amplifier 29 and the inverting amplifier 28, the power transistors 30 and 31, the power Zener diodes 32 and 33, the power resistors 34 and 35 and the acceleration capacitors 36 and 37. The entire system is constructed in duplicate, because in the actuator 25, two magnetic coils are to be supplied alternately with current for actuating the abrasion tool. One branch with the components 29, 30, 33, 35 and 37 is for the feed and insertion of the tool during a phase angle of 90° and the other branch with the components 28, 31, 32, 34 and 36 is for the return during a phase angle of 270°, which makes the angle total up to 360°. Power transistors 30 and 31 with a 200 V blocking voltage are appropriately used as control transistors. The self-induction of the electromagnetic coils of the actuator 25 produces high switching voltage peaks, which make great demands on the blocking capacity of the power transistors 30 and 31. In addition, the voltage peaks are greatly damped by the power Zener diodes 32 and 33 which divert voltages above 100 V. The power resistors 34 and 35 limit the current through the coils of the actuator 25 such that excessive heating does not occur. Since a rapid reciprocating movement of the tool is desirable between the stops of the actuator 25, the resistors 34 and 35 are shunted by acceleration capacitors 36 and 37. The charging current surges of these capacitors pass by way of the coils of the actuator 25 and produce an additional current and thus also acceleration force at the time when the tool must be moved. As regards current, the power resistors 34 and 35 are heavily loaded and are appropriately attached to the rear wall of the housing 65 (FIG. 6), where the latter are well cooled.

Figures 4, 5:
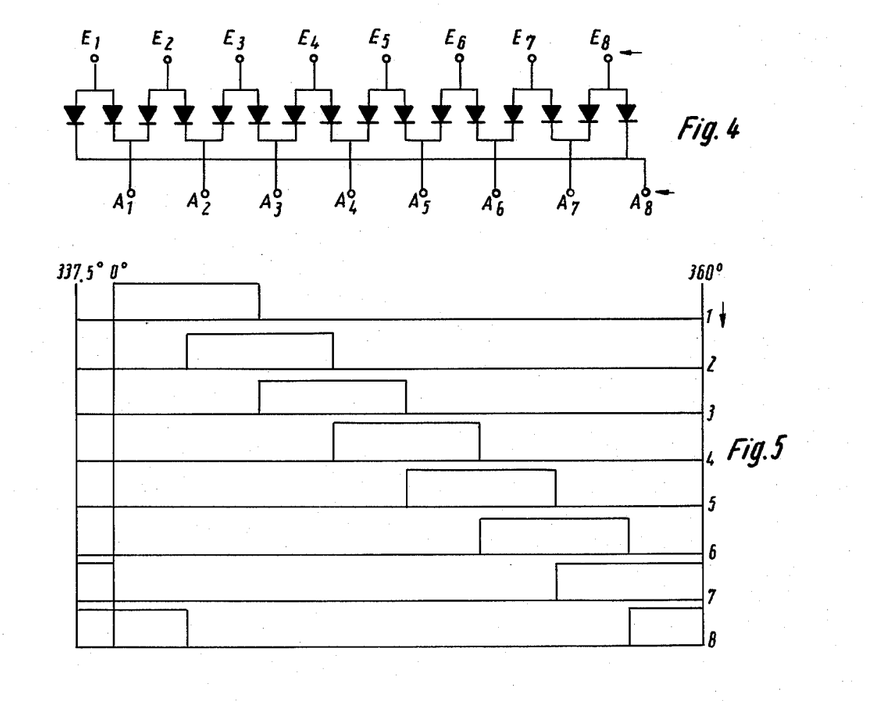
FIG. 4 shows the OR-gate circuit, which converts the 45° signals, which come from the reducer circuit, into 90° signals.
FIG. 5 shows the eight signals which can be adjusted selectively for actuating the abrasion tool.
Figure 6:
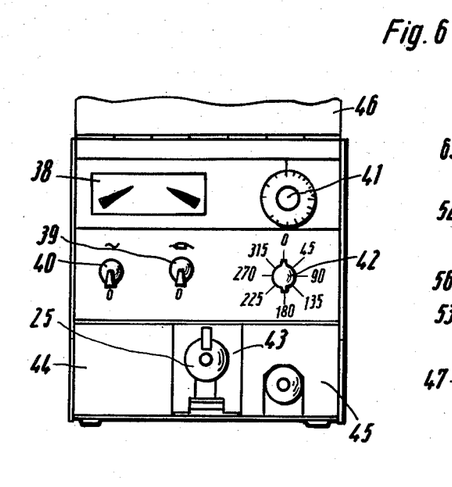
FIG. 6 shows the construction of the entire appliance.
Figure 7:
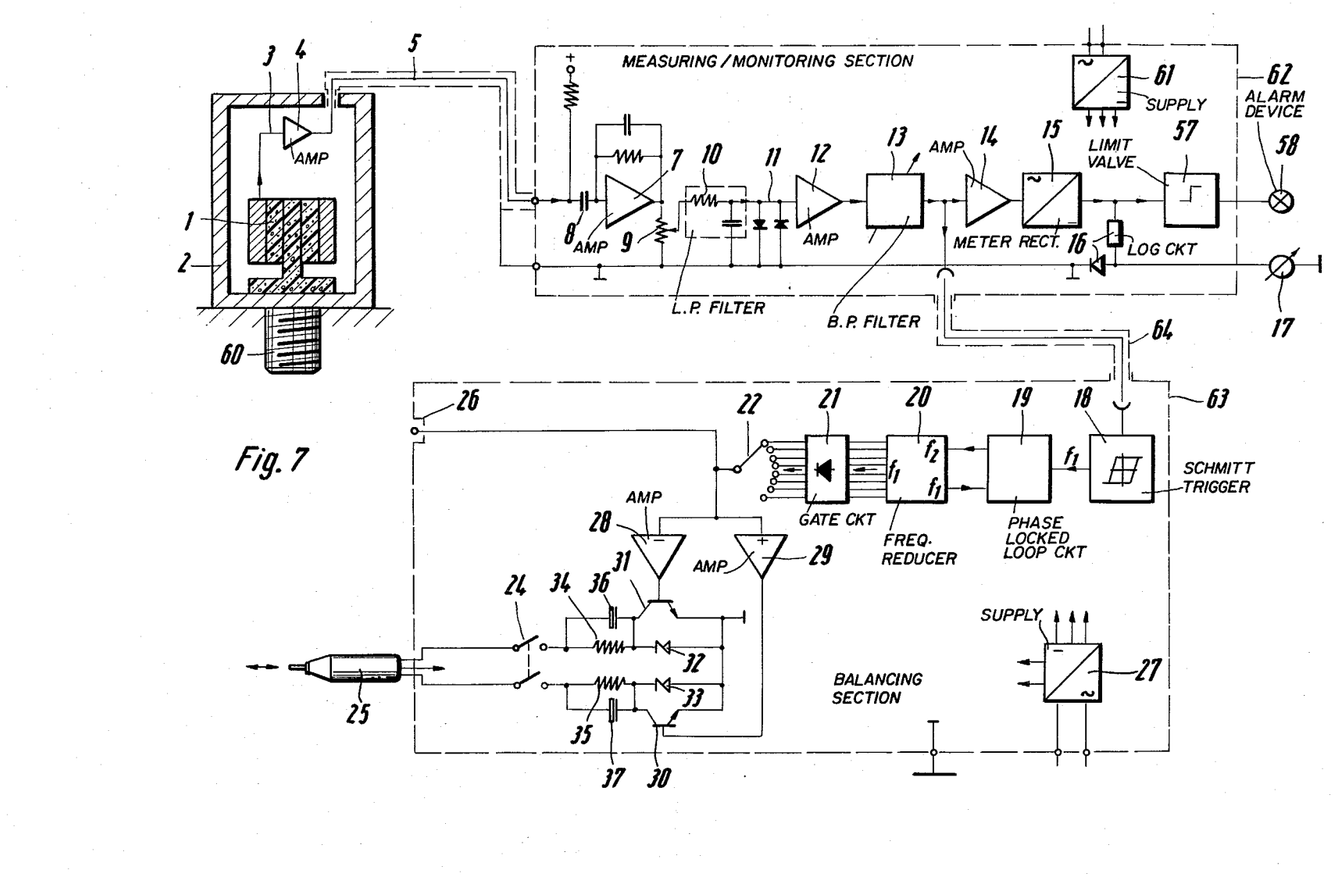
FIG. 7 is a diagram of the electronics when divided into a measuring and monitoring part and a balancing part.

In FIG. 3, the uppermost line shows the signal which the phaselocked loop circuit 19 (FIG. 1) transmits to the frequency reducer 20. It is thus assumed that the period from 0° to 360° corresponds to the basic unbalance signal. The lower lines 1 to 8 of FIG. 3 show the signals which appear at the outputs 1 to 8 of the frequency recorder 20. FIG. 4 is a circuit diagram of the gate circuit 21. The signals appear at its outputs A1 to A8, as shown in FIG. 5. FIG. 6 shows the arrangement of the electronic box. In the latter, the reference numeral 38 designates the instrument with logarithmic indication, where different colours indicate the three ranges for rough balancing, fine balancing and "balance satisfactory". The reference numeral 39 designates the actuator switch, which corresponds to 24 in FIG. 1 and the reference numeral 40 designates the mains power supply switch. The reference numeral 41 designates the knob for the number of revolutions. The knob 41 acts on a ten-turn potentiometer. The dial is driven by the knob 41 by way of an approx. 10:1 reduction gear. The reference numeral 42 designates the fully rotating phase angle selector for the phase relationship between the pick-up vibration and abrasion tool vibration with eight positions with angles of rotation each of 45°. The reference numeral 43 designates the container for the actuator and 44 designates the storage space for the actuator cable. The reference numeral 45 designates the storage space for the vibration pick-up with the cable. The vibration pick-up itself together with its magnets can be located on the base of the electronic housing. The reference numeral 46 designates the lid of the electronic housing with the short operating instructions, which covers the entire operating face and can be swung upwards. The reference numeral 47 designates the three support pins on the rear wall of the housing, which also serve for winding up the mains cable. The reference numeral 48 designates the mains cable itself. The reference numeral 49 designates the mains fuse and 50 the selector switch for the mains voltage. The reference numeral 51 designates the carrying handle on the electronic housing and 52 the identification plate. The reference numeral 53 designates the plug connection for the vibration pick-up, which normally always remains attached and is only dismantled for the purposes of checking or repairs. The reference numeral 54 designates the plug connection for the actuator, which too always remains attached. The reference numeral 55 designates a cover plate and 56 the plug socket for the stroboscope. The reference numeral 65 designates the rear wall of the housing, to which the power resistors 34 and 35 are attached on the inside (FIG. 6). The control electronics are located on a European card, which can be easily removed from the housing. The power resistors 34 and 35 for actuating the abrasion tool are located on the rear wall of the housing 65, which on account of its large mass is easily able to discharge the heat produced. The design is not only easy to operate, but also easy to maintain and repair. FIG. 7 shows the electrical circuit diagram for the case where the entire balancing apparatus is split into a measurement/monitoring part and a balancing part. The split apparatus has few differences compared with the combined apparatus according to FIG. 1. The construction of the vibration pick-up is the same, apart from the fact that it is attached by a screw connection 60 to the machine to be monitored and balanced. The electronics are divided into a measuring and monitoring part 62 with units 7 to 16 and 61, and into a balancing part 63 with units 18 to 37. Added to the measuring and monitoring part 62 are a limit value switch 57 and an alarm device 58, for example a light or horn. The instrument 17 and the alarm device 58 are located at a visible point, which is determined by the machine manufacturer. Since the measuring and monitoring part 62 operate constantly, it must have its own mains part 61, also a plug connection for the attachment of the balancing part 63.

Figure 8:
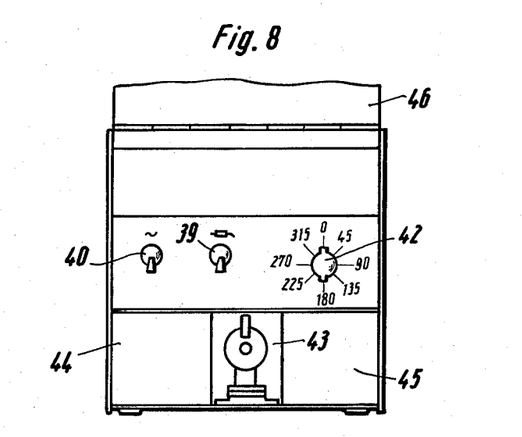
FIG. 8 shows the simplified electronic box of the balancing part when divided into a measuring and monitoring part and a balancing part.

The balancing part 63 contains units 18 to 37, i.e. everything that is not contained in the measuring and monitoring part 62. The method of operation is exactly the same as described in the combined apparatus. The latter is located in a smaller housing (c.f. FIG. 8). Compared with FIG. 6, this housing does not contain the instrument 38, the knob 41 and the vibration pick-up. The rear side remains the same as in FIG. 6. The measuring and monitoring part 62 and the balancing part 63 are interconnected by a screened cable.

We claim:

1. Apparatus for balancing and monitoring unbalanced vibrations of a rotating member comprising vibration pick-up means located on a mounting of the rotating member for producing an electrical signal which corresponds to a component of a unbalanced force of the rotating member and extending in an axial direction of the vibration pick-up means, an abrasion tool, an electromechanical actuator means responsive to the electrical signal and having a part for supporting the abrasion tool, the electromechanical actuator means in response to the electrical signal controlling the abrasion tool to effect working vibration of the abrasion tool at a frequency corresponding to the speed of the rotating member to remove material from the rotating member in-phase with the working vibration in the same angular region of the rotating member for effecting a balancing of the rotating member, and means for enabling adjustment of a phase relationship of the vibration of the abrasion tool with respect to a phase relationship of the unbalanced electrical signal so as to effect shifting by any number of steps of 360°/n, n being a whole number > 3, irrespective of the speed of the rotating member, the means for enabling adjustment including a phase-locked loop circuit for producing a phase-locked oscillation at n-times an unbalanced frequency, the phase-locked loop circuit being connected to an n-factor frequency reducer, a signal from the frequency reducer being compared in the phase-locked loop circuit with the electrical signal from the vibration pick-up means, and the difference influencing the frequency of the phase-locked loop circuit such that the signal supplied to the frequency reducer corresponds to the electrical signal as regards frequency and phase.

2. Apparatus according to claim 1, characterized in that the frequency reducer provides n outputs emitting n signals whose frequency is reduced n-times and which have a phase difference with respect to each other of 360°/n.

3. Apparatus according to claims 1 or 2, characterized in that $n=8$.

4. Apparatus according to claim 3, characterized in that the frequency reducer is followed by a gate circuit consisting of eight OR-gates which produce eight square wave signals having a duration of 90°, each having a phase shift of 45° with respect to each other.

5. Apparatus according to claim 1, characterized in that the vibration pick-up means includes a pick-up unit providing a sinusoidal unbalanced signal and a Schmitt trigger with a hysteresis for converting the sinusoidal signal into a square wave signal supplied to the phase-locked loop circuit, the Schmitt trigger having a sensitivity threshold adjustable by an adjustable value of the hysteresis of the Schmitt trigger.

6. Apparatus according to claim 5, characterized in that the unbalanced signal from the vibration pick-up means is filtered by a Wien bridge band-pass filter coupled between the pick-up unit and the Schmitt trigger.

7. Apparatus according to claim 6, characterized in that the Wien bridge band-pass filter has a quality factor Q between 50 and 150.

8. Apparatus according to claim 6, characterized in that after filtering by the Wien bridge band-pass filter, the unbalanced signal is amplified by an indication amplifier, rectified with a meter rectifier, and indicated by a logarithmation circuit at an instrument having a logarithmic characteristic.

9. Apparatus according to claim 1 or 5, characterized in that a limit value switch actuates an alarm device upon the electrical signal of the vibration pick-up means exceeding a predetermined limit value.

10. Apparatus according to claim 5, characterized in that a low-pass filter and a limiting circuit with two diodes in anti-parallel connection are coupled to the output of the pick-up unit.

11. Apparatus according to claim 6, characterized in that the Wien bridge band-pass filter is adjusted with a multi-turn potentiometer and the filter-pass frequency is indicated on a dial which is driven by the potentiometer shaft by way of reduction gearing having a reduction factor corresponding to the number of turns of the potentiometer.

12. Apparatus according to claim 1, characterized in that the means for enabling adjustment includes a fully rotating phase angle selector without a stop for adjusting the phase shift.

13. Apparatus according to claim 1; characterized in that power stages are provided for the actuator means, the power stages being equipped with acceleration capacitors of high capacitance having a charging current surge serving to achieve a rapid switching speed of the abrasion tool by the actuator means.

14. Apparatus according to claim 12, characterized in that a connection lead is provided from the phase angle selector to a plug socket for enabling the triggering of a stroboscope.

15. Apparatus according to claim 1, characterized in that a housing is provided with storage compartments for the vibration pick-up means, the actuating means and a cable.

16. Apparatus according to claim 8, characterized in that the instrument having a logarithmic characteristic is provided with an unbalanced indicator having a logarithmic scale with different ranges of unbalanced vibration being indicated on the scale with different colors.

17. Apparatus according to claim 15, characterized in that the front side of the housing with the instrument is covered with a lid secured by a magnet.

18. Apparatus according to claim 1, characterized in that the apparatus consists of first and second parts, at least a portion of the first part being mountable on several different machines and serving for the pick-up of vibrations, monitoring and triggering an alarm, and a second part for enabling a connection to the monitoring system of different machines and for undertaking balancing.

19. Apparatus according to claim 6, characterized in that at least the sensitivity of the vibration pick-up means and of the Wien bridge band-pass filter are adjusted to the hysteresis of the Schmitt trigger coupled to the Wein bridge band-pass filter such that the Schmitt trigger begins to operate with a threshold of unbalanced vibration of 0.05 to 0.2 $\mu$m.

20. Apparatus according to claim 1, characterized in that the vibration pick-up means produces an unbalanced signal of a sinusoidal waveform, the electrochemical actuator means controlling the abrasion tool to remove material from the rotating member until one of the unbalance of the rotating member is no longer present and the unbalance signal is no longer present, the means for enabling adjustment including a multi-position switch providing for a stepped phase adjustment.

21. Apparatus according to claim 20, characterized in that the rotating member is an operating grinding wheel.

* * * * *